June 7, 1955  R. M. A. BARON  2,710,193
MECHANICAL GRIPPING CHUCK
Filed June 20, 1951
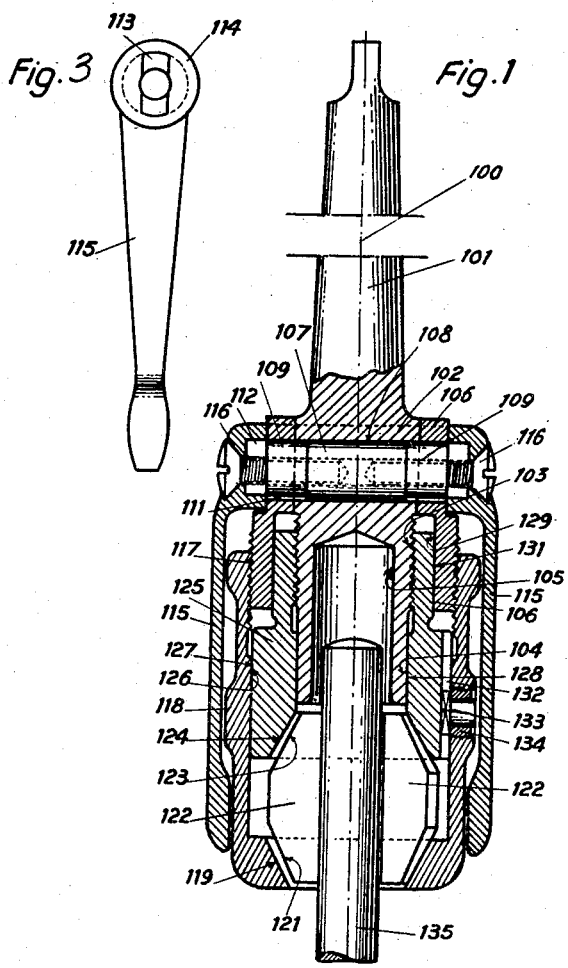
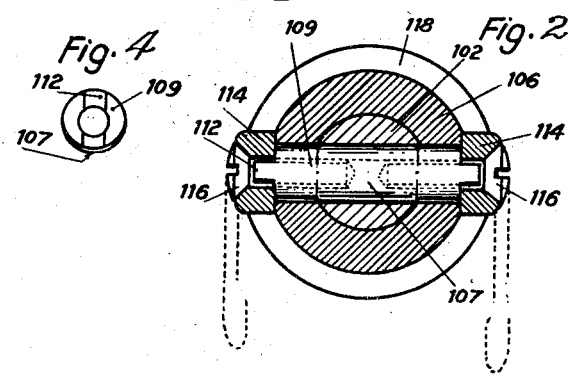
Inventor:
Raoul Marie Amédée Baron

United States Patent Office 2,710,193
Patented June 7, 1955

2,710,193

MECHANICAL GRIPPING CHUCK

Raoul Marie Amédée Baron, Paris, France

Application June 20, 1951, Serial No. 232,647

Claims priority, application France June 21, 1950

6 Claims. (Cl. 279—56)

The present invention has for its object to provide a chuck, that is an apparatus intended to secure to the end of the drive shaft of a machine tool (lathe, driller or the like) a work-piece or a tool whose axis is to be in alignment with the drive shaft of the machine.

The chuck according to the invention comprises essentially, a head rotatable jointly with the drive shaft and provided with two screw threads hereinafter termed outer threads and inner threads and which may be either of equal pitches but of the opposite senses, or of the same sense but of different pitches so as to act as differential threads. On this head are two sleeves, the outer one being adapted to be screwed on the outer threads and the inner one on the inner threads. These two sleeves overlap each other and a keying system causes them to rotate jointly while permitting them to move with respect to each other longitudinally. It is conceivable that if the outer sleeve is rotated in a certain sense, it will, because of its engagement with the outer threads, take a certain longitudinal movement, but as, because of the keying, it rotates the inner sleeve the latter will move longitudinally either in a contrary direction (if the senses of threads are opposed) or in the same direction, but an unequal amount (if the threads are of the same sense with differential pitches).

The accuracy of the concentricity of the two sleeves is constantly ensured, during all their displacements, by the manner in which they are mounted on each other and on the cylindrical shaft of the chuck.

The ends of said sleeves have inner housings limited by conical surfaces inclined towards the chuck axis, these inclinations being of inverse sense; jaws having outer surfaces corresponding to the conical surfaces penetrate into said housings in such a way that, by a wedging effect, the simultaneous longitudinal displacements of the two sleeves have for their effect, if they move toward each other, to tighten the jaws while moving them toward the chuck axis; the displacement in the contrary direction of the sleeves permits, on the contrary, the jaws to move away from the axis.

The invention will be more clearly understood by referring to the accompanying drawings which show, by way of example, some embodiments thereof, and in which:

Fig. 1 is a longitudinal section, in elevation, with parts broken away, of a chuck with eccentrics and locking and unlocking levers;

Fig. 2 is a transversal section across the axis of the tightening eccentric;

Fig. 3 is an inward face view of a tightening lever;

Fig. 4 is an end view of the tightening eccentric.

In Figs. 1 to 4, it is seen that 101 is the shank for centering and securing the chuck on the shaft of a machine employing the same.

The shank 101 has an inner cylindrical guide-portion 102 followed by a threaded part 103 and then by a further cylindrical part 104, all coaxial and integral with 101 the inner cylindrical guide-portion 102, the threaded part 103 and the cylindrical part 104 forming the central chuck head member.

The parts 103 and 104 have a central bore 105 adapted to receive shanks of drills or the like, tightened in the chuck. Slidably guided with accuracy on 102 is the cylindrical chuck head member 106, the central chuck head member and this cylindrical chuck head member forming a chuck head means. The head member 106 turnably supports jointly with 101 an axle 107 rotatable in a bore 108 formed in 102, perpendicularly to the axis of rotation 100 of the chuck and intersecting this axis.

The ends 109 of axle 107, extending beyond 102, are cylindrical and eccentric with respect to the axis of the central cylinder 107 (Fig. 4). The axes of cylinders 107 and 109 are spaced by a distance that may be equal, for example, to a small percent of the longitudinal mutual displacement of the sleeves 125 and 118, during one revolution turn of 118, as described below.

The ends 109 are respectively housed in bores 111, of the same diameter as 108, traversing the head 106. These bores 111 may form an extension of 108 and it is easy to introduce into bore 108 the axle 107 which rotates without play in bore 108 and which is shorter than bore 108.

Each end of the axle 107 carries a pair of non-circular projections 112 or any other driving means, that penetrates into a mating cutout 113 (Fig. 3) formed in the head 114 of lever 115 secured to the axle by means of a screw 116, for example, which extends between projections 112 into a threaded bore of axle 107. This assemblage is made in such a way that the heads 114 locate the axle 107, without longitudinal play of the latter, in bores 111 and 108 and that, when the levers 115 extend downwards, as shown in Fig. 1, the eccentrics 109 locate the head 106 in its uppermost position.

The head 106 receives, screwed on it by means of threads 117, the outer sleeve 118 whose lowermost inner conical surface 119 engages the inclined surfaces 121 of a plurality of jaws 122 whose upper inclined surfaces 123 are pressed against the conical surface 124 at the lower portion of the inner sleeve 125 which, with its outer cylindrical surface 126, sliding in the cylindrical portion 127 of the outer sleeve 118, serves as a guide for the latter.

On the other hand, according to the invention the inner sleeve 125 is screwed on the threads 103 whose pitch may be different in magnitude or in sense, or in both, from the pitch of threads 117.

The sleeve 125 is guided, by its inner cylindrical portion 128, on 104 and, by its outer cylindrical portion 129, in the cylindrical interior 131 of the body 106.

According to the invention, the outer and inner sleeves 118 and 125, respectively are jointly rotatable, after being assembled, by means of grooves 132 formed in sleeve 118, as by locating a projection of each key in a bore of the plug carrying the same.

Tightening is effected, when the levers 115 extend, for example, in a plane forming with the axis 100 an angle of from 60° to 90°, by manually turning outer sleeve 118 that turns inner sleeve 125 through key 133, to produce a slight tightening, for example, on the part 135 by movement of surfaces 119 and 124 toward each other to displace jaws 122 toward axis 100. The tightening will then be completed to lock shank 135 by displacing the levers 115 downwardly into the vertical plane. This movement displaces upwardly the part 106, and hence the outer sleeve 118 without displacing the inner sleeve 125. The surfaces 119 and 124 are therefore moved strongly toward each other and act upon the faces 121 and 123 of jaws 122 to tighten them on 135.

Upward motion of levers 115, eventually through an angle larger than that having served for tightening and even through 180°, will release shank 135 to a predetermined extent, on the entire stroke of the eccentric, the outer and inner sleeves moving away from each other to unlock their grip. The manual loosening by rotating outer sleeve 118 will then be very easy.

This great facility of effective locking and unlocking permits using jaws in which the angles of inclined faces 121, 123 with the axis 100 is greater than usual; this in turn permits, with equal displacement of the sleeves, use either of a chuck of reduced length or permits locking pieces of greater diameter.

What is claimed is:

1. A chuck comprising, in combination, elongated chuck head means having a predetermined central axis, having an outer threaded portion located about said axis, and having an inner threaded portion also located about said axis, being nearer thereto than said outer threaded portion, and being threaded differently than said outer threaded portion; an inner sleeve threadedly engaging said inner threaded portion of said chuck head means and having a first conical surface directed toward said axis and forming part of a cone whose apex is in said axis, said inner sleeve having an outer cylindrical surface located about said axis; an outer sleeve threadedly engaging said outer threaded portion of said head means, and having a second conical surface spaced along said axis from said first conical surface, directed toward said axis, forming part of a cone whose apex is in said axis, and being inclined oppositely to and directed toward said first conical surface, said outer sleeve having an inner cylindrical surface slidably engaging said outer cylindrical surface of said inner sleeve; a plurality of elongated jaw members carried by at least one of said sleeves, extending along and being distributed about said axis, and each having oppositely inclined surface portions respectively engaging said first and second conical surfaces; and connecting means interconnecting said sleeves for simultaneous rotation about said axis and for mutual displacement along said axis, so that said sleeves may be turned in one direction about said axis to cause said jaw members to approach said axis.

2. A chuck comprising, in combination, elongated chuck head means having a preedtermined central axis, having an outer threaded portion located about said axis, and having an inner threaded portion also located about said axis, being nearer thereto than said outer threaded portion, and being threaded differently than said outer threaded portion, said chuck head means having an outer cylindrical surface located about said axis and located adjacent to said inner threaded portion; an inner threaded sleeve threadedly engaging said inner threaded portion of said chuck head means, having an inner cylindrical surface slidably engaging said outer cylindrical surface of said chuck head means, and having a first conical surface forming part of a cone whose apex is in said axis; an outer sleeve threadedly engaging said outer threaded portion of said head means, and having a second conical surface spaced along said axis from said first conical surface, forming part of a cone whose apex is in said axis, and being inclined oppositely to and directed toward said first conical surface; a plurality of elongated jaw members carried by at least one of said sleeves, extending along and being distributed about said axis, and each having oppositely inclined surface portions respectively engaging said first and second conical surfaces; and connecting means interconnecting said sleeves for simultaneous rotation about said axis and for mutual displacement along said axis, so that said sleeves may be turned in one direction about said axis to cause said jaw members to approach said axis.

3. A chuck comprising, in combination, elongated chuck head means having a predetermined central axis, having an inner threaded portion located about said axis, and having a cylindrical portion located about said axis and said inner threaded portion and having an inner cylindrical surface spaced from and facing said inner threaded portion, said cylindrical portion of said chuck head means having an outer threaded surface providing said chuck head means with an outer threaded portion, and said inner and outer threaded portions being threaded differently from each other; an inner sleeve threadedly engaging said inner threaded portion of said chuck head means, having an outer cylindrical surface slidably engaging said inner cylindrical surface of said cylindrical portion of said chuck head means, and having a first conical surface forming part of a cone whose apex is in said axis; an outer sleeve threadedly engaging said outer threaded portion of said head means, and having a second conical surface spaced along said axis from said first conical surface, forming part of a cone whose apex is in said axis, and being inclined oppositely to and directed toward said first conical surfaces; a plurality of elongated jaw members carried by at least one of said sleeves, extending along and being distributed about said axis, and each having oppositely inclined surface portions respectively engaging said first and second conical surfaces; and connecting means interconnecting said sleeves for simultaneous rotation about said axis and for mutual displacement along said axis, so that said sleeves may be turned in one direction about said axis to cause said jaw members to approach said axis.

4. A chuck comprising, in combination, elongated chuck head means having a predetermined central axis, having an inner threaded portion located about said axis, having an outer cylindrical surface located about said axis adjacent said inner threaded portion, and having a cylindrical portion located about said axis and said inner threaded portion and having an inner cylindrical surface spaced from and facing said inner threaded portion, said cylindrical portion of said chuck head means having an outer threaded surface providing said chuck head means with an outer threaded portion, and said inner and outer threaded portions being threaded differently from each other; an inner sleeve threadedly engaging said inner threaded portion of said chuck head means, having a first outer cylindrical surface slidably engaging said inner cylindrical surface of said cylindrical portion of said chuck head means, having a second outer cylindrical surface spaced along said axis from said cylindrical portion of said chuck head means, having an inner cylindrical surface slidably engaging said outer cylindrical surface of said chuck head means and having a first conical surface directed towards said axis and forming part of a cone whose apex is in said axis; an outer sleeve threadedly engaging said outer threaded portion of said chuck head means, having an inner cylindrical surface slidably engaging said second cylindrical surface of said inner sleeve, and having a second conical surface spaced along said axis from said first conical surface, directed toward said axis, forming part of a cone whose apex is in said axis, and being inclined oppositely to and directed toward said first conical surface; a plurality of elongated jaw members carried by at least one of said sleeves, extending along and being distributed about said axis, and each having oppositely inclined surface portions respectively engaging said first and second conical surfaces; and connecting means interconnecting said sleeves for simultaneous rotation about said axis and for mutual displacement along said axis, so that said sleeves may be turned in one direction about said axis to cause said jaw members to approach said axis.

5. A chuck comprising, in combination, elongated chuck head means having a predetermined central axis, having an outer threaded portion located about said axis, and having an inner threaded portion also located about said axis, being nearer thereto than said outer threaded portion, and being threaded differently than said outer threaded portion; an inner sleeve threadedly engaging said inner threaded portion of said chuck head means and having a first conical surface directed toward said axis and forming part of a cone whose apex is in said axis, said inner sleeve having an outer cylindrical surface located about said axis and formed with a groove substantially parallel to said axis; an outer sleeve threadedly engaging said outer threaded portion of said head means, and having a second conical surface spaced along said axis from said first conical surface, directed toward said axis, forming part of a cone whose apex is in said axis, and being inclined oppositely to and directed toward said first conical surface; a plurality of elongated jaw members carried by at least one of said sleeves, extending along and being distributed about said axis, and each having oppositely inclined surface portions respectively engaging said first and second conical surfaces; and a key carried by said outer sleeve and being slidably located in said groove of said inner sleeve so that said inner and outer sleeves are interconnected for simultaneous rotation about said axis and for mutual displacement along said axis, so that said sleeves may be turned in one direction about said axis to cause said jaw members to approach said axis.

6. A chuck comprising, in combination, an elongated rigid chuck head member having a predetermined central axis, having a threaded surface portion forming an inner threaded portion of the chuck, and being formed with a bore normal to said axis; a cylindrical member located about said head member, having an outer threaded surface threaded differently from said inner threaded portion and forming an outer threaded portion of the chuck, and being formed with a pair of openings respectively located at opposite ends of and forming extensions of said bore; an axle having a cylindrical portion located in said bore and slidably engaging said head member so that said axle is turnable about an axis normal to said central axis, said axle having a pair of opposite eccentric end portions respectively located in said openings of said cylindrical member so that upon turning of said axle said cylindrical member will be shifted along said central axis; an inner sleeve threadedly engaging said inner threaded portion and having a first conical surface forming part of a cone whose apex is in said axis; an outer sleeve threadedly engaging said outer threaded portion and having a second conical surface spaced along said axis from said first conical surface, forming part of a cone whose apex is in said axis, and being inclined oppositely to and directed toward said first conical surface; a plurality of elongated jaw members carried by at least one of said sleeves, extending along and being distributed about said axis, and each having oppositely inclined surface portions respectively engaging said first and second conical surfaces; connecting means interconnecting said sleeves for simultaneous rotation about said axis and for mutual displacement along said axis, so that said sleeves may be turned in one direction about said axis to cause said jaw members to approach said axis; and lever means connected to said axle for turning the latter in said bore so that after a tool or the like is gripped by said jaws said lever means may be operated to turn said axle and shift said outer sleeve along said axis to increase or decrease the gripping force of said jaws.

References Cited in the file of this patent

UNITED STATES PATENTS

| | | |
|---|---|---|
| 1,115,310 | Halvorsen-Pande | Oct. 27, 1914 |
| 1,253,240 | Hart | Jan. 15, 1918 |
| 1,433,776 | Brown | Oct. 31, 1922 |
| 1,850,938 | Miller et al. | Mar. 22, 1932 |
| 1,875,737 | Johnson | Sept. 6, 1932 |
| 2,468,465 | Sawyer | Apr. 26, 1949 |

FOREIGN PATENTS

| | | |
|---|---|---|
| 398,390 | France | Mar. 22, 1909 |